No. 881,456. PATENTED MAR. 10, 1908.
H. BERG.
DYNAMO ELECTRIC MACHINE.
APPLICATION FILED AUG. 8, 1905.
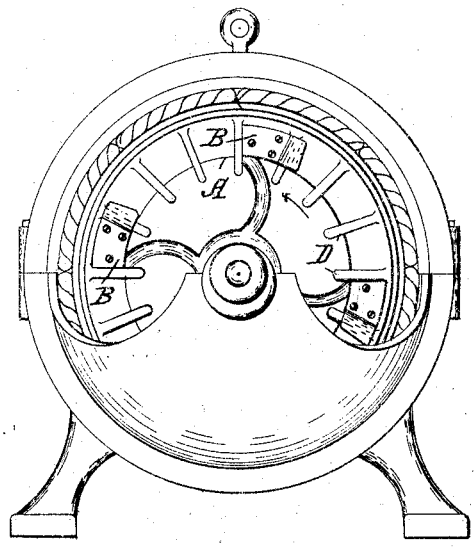
Fig. 1.
Fig. 4.
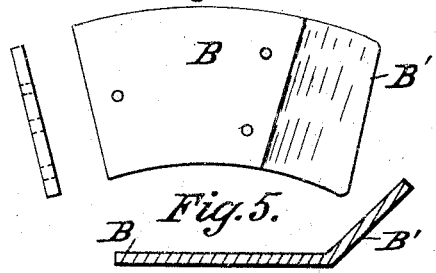
Fig. 5.
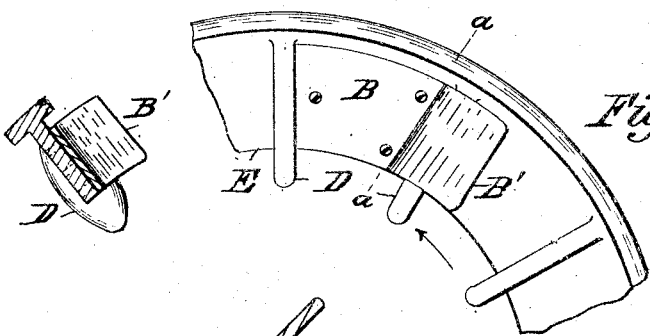
Fig. 3. Fig. 2.
Fig. 6.
WITNESSES:
INVENTOR
Henry Berg
By Fischer & Sanders
ATTORNEYS

UNITED STATES PATENT OFFICE.

HENRY BERG, OF ORANGE, NEW JERSEY.

DYNAMO-ELECTRIC MACHINE.

No. 881,456.

Specification of Letters Patent.

Patented March 10, 1908.

Application filed August 8, 1905. Serial No. 273,249.

*To all whom it may concern:*

Be it known that I, HENRY BERG, a citizen of the United States, residing in the city of Orange, county of Essex, and State of New Jersey, have invented a new and useful Improvement in Dynamo-Electric Machines, of which the following is a clear and exact description, such as will enable others skilled in the art to which it appertains to make and use the same.

Hitherto it has been proposed to provide the armature of a dynamo or motor with a set of fan or propeller blades of such a pitch as to direct a current of air between the armature and field magnets and thus cool the motor or dynamo, but this plan is objectionable for the reason that dust, dirt and other debris are blown into the machine, so that it is liable to short-circuit or otherwise clog up the machine.

By my construction, the draft is away from the machine so that the dirt etc., is driven away and thus short-circuiting or clogging is avoided, while the current of air passing as it does over the parts in which there is a tendency to overheat, keeps such parts at a temperature but slightly above the normal.

In the accompanying drawings forming a part of this specification. Figure 1. illustrates a common form of induction motor showing my improvement secured to the armature. Fig. 2. is an enlarged broken view of the same. Fig. 3. is a section on line a of Fig. 2. Fig. 4. is a detached plan view. Fig. 4ª. is an end view. Fig. 5. is a longitudinal section showing the angle of the fan or wing. Fig. 6. illustrates a modification.

Like letters of reference refer to like parts throughout the drawings and specification.

In carrying out my invention I secure at convenient points on the ends of the armature A the wings or fans B by means of bolts, screws or rivets as shown in Fig. 2. The end $B^1$ of the fan is bent at an angle of about 45° from the plane of the base thereof so that during the rotation of the armature in the direction indicated by the arrow, the air contiguous to the machine is driven away from it and a constant current is set up which current enters the machine adjacent to and around the armature shaft, and is immediately directed away from the ends of the armature, and carries with it all dust, dirt etc. which might otherwise accumulate within and around the armature. In practice I find that two of these fans or wings secured to each end of the armature of a motor of the type shown will keep the temperature down to the vicinity of 100° F., whereas prior to their use, and under the same conditions the temperature of the armature and surrounding parts would run up as high as 160° to 170° F. and even higher. I have shown the wings B as secured to the supporting rings C, between adjacent ventilating blades D, on the supporting ring E. I may, however, construct the ring E and the wings B integral as shown in Fig. 6, and dispense with the ventilating blades D, entirely or with a portion of them. These fans may be applied to dynamos and motors of any type and be equally efficacious in keeping the same cool, and free from dust dirt etc.

What I claim is:

1. In a dynamo electric machine, the combination of a solid ring armature with a series of fans or wings attached to each end of said armature adjacent to its periphery, said fans or wings being inclined away from the direction of rotation of said armature.

2. In a dynamo electric machine, the combination with field magnets and a solid ring armature, of fans or wings upon each end of said armature adjacent to its periphery adapted to create a current of air away from each end of said armature during the rotation thereof.

3. In a dynamo electric machine, the combination with the field magnets and a solid ring armature, of fans or wings upon each end of said armature adjacent to its periphery, said fans or wings being inclined away from the direction of rotation of said armature, whereby upon the rotation of the same a current of air is created in a direction parallel with the axis of and away from each end of said armature.

4. A clearing and cooling device for dynamo electric machines having a solid ring armature comprising a series of inclined fans or wings secured to each end of said armature adjacent to its periphery, said fans or wings designed to create a current of air away from each end of the armature.

5. A clearing and cooling device for dynamo electric machines having a solid ring armature comprising fans or wings secured to each end of said armature adjacent to its periphery, said fans or wings consisting of flat metallic plates bent at an angle away from the direction of motion of said armature.

This specification signed and witnessed this 4th day of August 1905.

HENRY BERG.

Witnesses:
 FRED'K C. FISCHER,
 VALENTINE FRICKEL.